United States Patent [19]

Zang et al.

[11] Patent Number: 5,188,741
[45] Date of Patent: Feb. 23, 1993

[54] TREATMENT OF SEWAGE SLUDGE

[75] Inventors: Richard B. Zang, Sandy Hook, Conn.; Motasimur R. Khan, Wappingers Falls, N.Y.

[73] Assignee: Texaco Inc., White Plains, N.Y.

[21] Appl. No.: 861,733

[22] Filed: Apr. 1, 1992

[51] Int. Cl.$^5$ ............................................. B01D 35/18
[52] U.S. Cl. .................................. 210/774; 210/770; 210/806; 210/180; 48/197 A
[58] Field of Search ............... 210/774, 770, 768, 806, 210/180, 181, 769, 759; 110/221, 229, 230, 346, 238, 245; 44/51; 48/210, 197 A

[56] References Cited

U.S. PATENT DOCUMENTS

| | | | |
|---|---|---|---|
| 3,507,788 | 4/1970 | Cole et al. | 210/774 |
| 3,687,646 | 8/1972 | Brent et al. | 48/209 |
| 4,012,322 | 3/1977 | Saigh et al. | 210/774 |
| 4,097,378 | 6/1978 | St. Clair | 210/774 |
| 4,290,269 | 9/1981 | Hedström et al. | 110/229 |
| 4,308,034 | 12/1981 | Hoang | 110/229 |
| 4,405,332 | 9/1983 | Rodriguez et al. | 44/51 |
| 4,657,681 | 4/1987 | Hughes et al. | 210/774 |
| 4,687,546 | 8/1987 | Willis | 210/774 |
| 4,933,086 | 6/1990 | McMahon et al. | 210/774 |
| 4,983,296 | 1/1991 | McMahon et al. | 210/774 |

Primary Examiner—Robert A. Dawson
Assistant Examiner—Ana M. Fortuna
Attorney, Agent, or Firm—James J. O'Loughlin; Albert Brent

[57] ABSTRACT

A process for treating sanitary sewage sludge to achieve increased solids, decreased viscosity, and a reduction of pathogens. The aqueous slurry of sewage sludge having a solids content in the range of about 3 to 35 wt. % is simultaneously conveyed and preheated, mascerated, heated in an heat exchanger, hydrothermally treated in a closed vessel under a blanket of nitrogen at about 500° F. and a pressure of about 750 psig and above the vapor pressure of water at that temperature, dewatered and cooled in a first multi-step flash evaporation zone where the pressure is dropped in three steps from about 750 psig to about 50 psig and then in a second flash evaporation zone the pressure is dropped to about 25 psig, cooling and condensing the vapor from said first and second flash evaporation zones, and removing a dewatered pumpable slurry of sewage sludge product having a solids content in the range of about 5 to 50 wt. % and a reduced amount of pathogens. The sewage sludge product may be used as land-fill, or land applied, or burned in a partial oxidation gasifier, boiler, or incinerator.

17 Claims, 1 Drawing Sheet

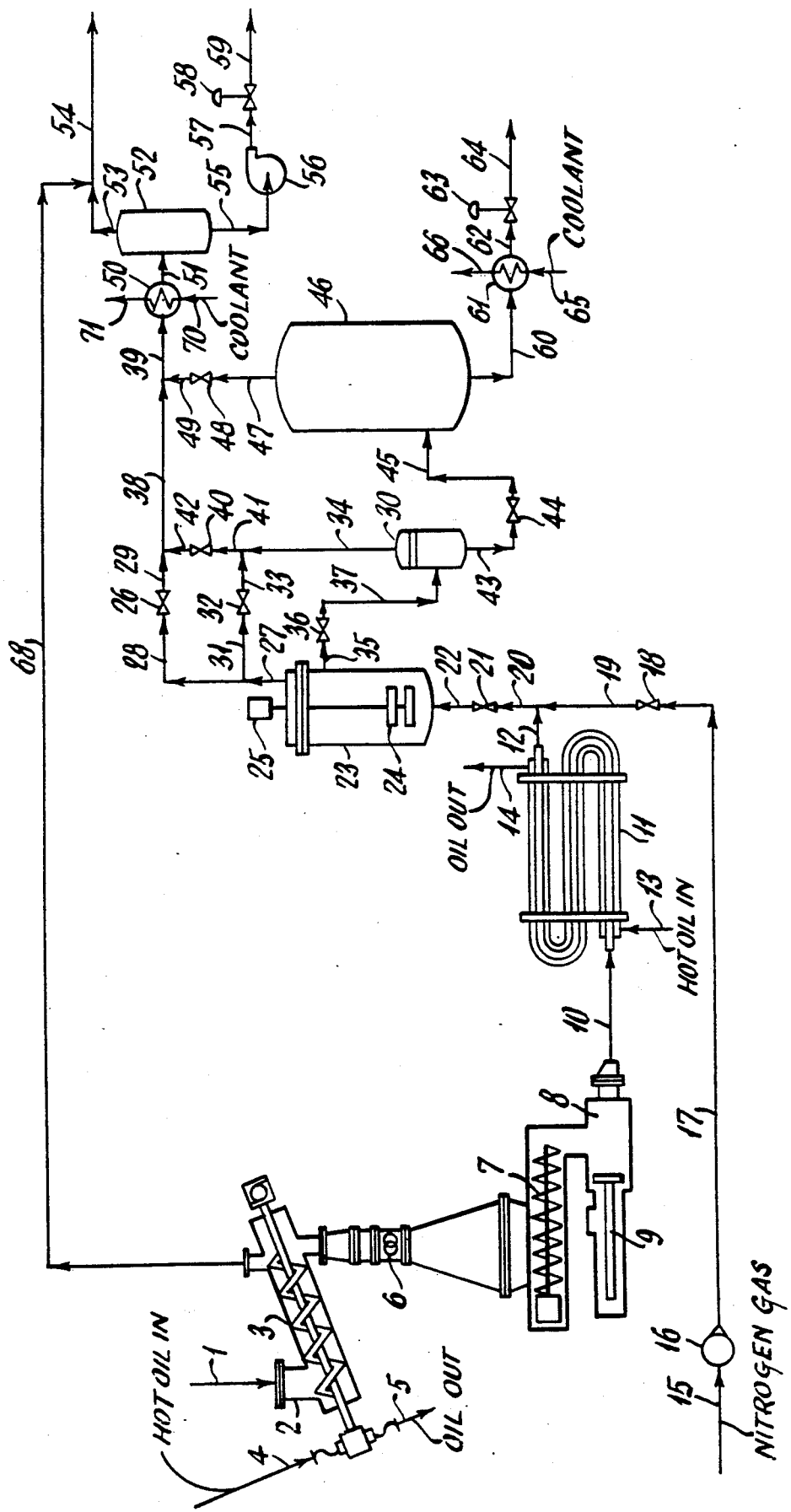

TREATMENT OF SEWAGE SLUDGE

FIELD OF THE INVENTION

This invention relates to a process for treating sanitary sewage sludge to achieve volume (weight) reduction, enhanced dewatering, viscosity reduction, and a reduction of pathogens and increased biological stability.

Under current Federal Regulation 40 CRF Part 257, Criteria for Classification of Solid Waste Disposal Facilities and Practices, the subject process can be defined as a Process to Further Reduce Pathogens (PFRP). Under proposed Federal Regulation 40 CFR Part 503, Technical Standards for the Use and Disposal of Sewage Sludge, the subject process prepares sewage sludge to meet Class A pathogen reduction requirements wherein the densities of indicator organisms are equal to or less than: (1) 2 $\log_{10}$ fecal coliform per gram of volatile suspended solids; and (2) 2 $\log_{10}$ fecal streptococci (enterococci) per gram of volatile suspended solids.

Treatment of sewage sludge is discussed in coassigned U.S. Pat. No. 3,507,788. Sewage sludge is gasified in a partial oxidation process described in coassigned U.S. Pat. No. 3,687,646. Upgrading aqueous slurries of sewage sludge by shearing without heating is described in coassigned U.S. Pat. No. 4,933,086. Agglomerating the organic matter in aqueous slurries of sewage sludge by heating, is described in coassigned U.S. Pat. No. 4,983,296. However, none of these references taken singly or in combination, teach or suggest the subject invention by which aqueous slurries of sewage sludge are hydrothermally treated and dewatered by multi-stage flash evaporation.

SUMMARY OF THE INVENTION

This invention pertains to an improved process for treating sewage sludge comprising the steps of: (1) simultaneously conveying and preheating an aqueous sludge slurry feed having a solids content in the range of about 3 to 35 wt. % to a temperature in the range of about 100° F. to 200° F. for about 30 seconds to 5 minutes; (2) mascerating the sewage sludge from (2); (3) pumping by means of a reciprocating positive displacement pump the mascerated sewage sludge from (2) through an indirect heat exchanger for about 8 to 10 minutes, thereby raising said sewage to a temperature in the range of about 400° F. to 600° F.; (4) hydrothermally treating the heated sludge from (3) in a closed reaction vessel under a blanket of nitrogen for about 15 to 45 minutes at a temperature in the range of about 400° F. to 600° F. and a pressure in the range of about 700 to 800 psig and above the vapor pressure of water at the reaction temperature to break down the fiber and gel structure of said sludge and to liberate trapped water; (5) dewatering and cooling the hydrothermally treated sludge from (4) in a first multi-step flash evaporation zone where the pressure is dropped from about 700 to 800 psig to a value in the range of about 25 to 75 psig and the saturation temperature falls to a value in the range of about 300° F. to 400° F. in two or more flash evaporation steps; and then in a second flash evaporation zone the pressure is dropped to a value in the range of about 10 psig to 50 psig and the saturation temperature falls to about 200° F. to 300° F. in one or more flash evaporation steps; (6) cooling the vapor from said first and second flash evaporation zones and separating out condensed liquids and uncondensed gases; and (7) removing a dewatered pumpable slurry of sludge from (5) having a solids content in the range of about 5.0 to 50 wt. % and a reduced amount of pathogens.

DESCRIPTION OF THE INVENTION

Municipal sanitary sewage sludge may be disposed of by the process of the subject invention without polluting the nation's environment.

The sewage sludge feed in the process is produced by treating raw municipal sanitary sewage by conventional processing steps and equipment. For example, the sewage from the municipal sewage line is passed through bar screens for the removal of large pieces of stone, wood, metal, and other trash which would clog channels or damage pumps. Coarse heavy inorganic noncombustibles, i.e. gravel, cinders, sand are then settled out in a grit chamber. Dry sewage sludge is composed of about 55 to 75 wt. % of combustible materials. The remainder substantially comprises noncombustible materials.

The sewage sludge is then separated into an aqueous suspension of sewage sludge and liquids. Concentration of the sewage may be accomplished by any suitable conventional way for separating solids and liquids e.g. gravity settling, filtration, centrifugation, hydroclone, or a combination thereof. For example, a preferable preliminary procedure is to introduce the screened over-flow from the grit chamber into a primary sedimentation tank such as a continuous clarifier as shown in Perry's Chemical Engineers' Handbook, McGraw-Hill, Fourth Edition, 1963, pages 19–50. Detention time in the sedimentation tank is sufficient for producing a pumpable aqueous slurry of primary sludge having a solids content of about 1 to 10 wt. % in about 1 to 24 hours. The primary sedimentation tank may also serve as a hold-up tank to even out discontinuities in the sewage composition. Alternatively, a separate holding tank may be used. In a preferred embodiment, a pumpable aqueous slurry of secondary sewage sludge in introduced into the holding tank and mixed with the primary sewage sludge. Secondary sewage sludge has a solids content in the range of about 0.5 to 5 wt. % and is derived from the liquid overflow from the previously mentioned primary sedimentation tank. The liquid overflow is processed in a conventional manner in order to produce secondary sewage sludge, and to reduce the BOD and organic solids content and to purify and demineralize the waste water which is separated from the secondary sewage sludge. Treatment of the liquid overflow from the primary sedimentation tank may include a combination of any or preferably all of the following steps, depending upon the end use of the water: pH adjustment; reduction of solids and BOD to about 30 parts per million or below; preferably by aerated biochemical treatment; clarification, optionally with coagulation; filteration or centrifugation; demineralizing; and activated carbon treatment.

The sludge underflow from the primary sedimentation tank comprising primary sewage sludge or from the holding tank comprising primary sewage sludge in admixture with about 20 to 60 wt. % (basis total sewage sludge) of secondary sewage sludge may be dewatered further if necessary to produce a thickened aqueous sewage sludge. The sludge is a fibrous material with particle sizes mostly ranging from 500 to 1000 microns, and with some longer hairs.

In the subject process, dewatered municipal sewage sludge at ambient temperature and having a solids content in the range of about 3 to 35 wt. %, a viscosity in the range of about 5,000 to 20,000 cP, such as 10,000 cP is simultaneously preheated to a temperature in the range of about 100° F. to 200° F., such as 180° F. for about 30 seconds to 5 minutes, and conveyed to a mascerating zone. All viscosities reported herein were measured in centipoise at 180° F. During this heating-conveying step, the viscosity of the sewage sludge is reduced to about 2,000 cP to 5,000 cP. Commercially available screw conveyors with hollow flights through which ordinary heat transfer fluids may pass, for example water or oil, are suitable for use as heat transfer fluids. In one embodiment, the screw conveyor-heater is inclined upwardly at an angle of about 15° to save space and to provide better drainage and venting. Advantageously, the heat transfer fluid may have been preheated by indirect heat exchange with hot sewage sludge product or vapor materials produced downstream in the process.

The heated sewage sludge is passed through a conventional mascerator where it is cut into small pieces having a maximum size of about ¼"×½"×2". Downstream equipment is thereby protected from tramp materials of larger size. The mascerated sewage sludge is conveyed up by a twin screw auger feed and introduced into the feed chamber of a dual piston, positive displacement, hydraulically driven pump. The preheated sewage sludge is thereby pumped through an indirect heat exchanger for example, double pipe or spiral types, at a pressure in the range of about 700 to 900 psig. Hot oil is used to heat the sewage sludge by indirect heat exchange. The sewage sludge enters the indirect heat exchanger at a temperature in the range of about 100° F. to 200° F. such as 180° F. and a viscosity in the range of about 2,000 to 3,000 cP. The sewage sludge leaves the heat exchanger at a temperature in the range of about 400° F. to 600° F., say about 500° F. and a viscosity in the range of about 1,000 to 1,500 cP, such as about 1,200 cP. The time in the double-wall heater is in the range of about 2 to 10 minutes, say about 3.5 minutes.

Nitrogen gas is used to maintain the saturation pressure and to blanket the hydrothermal reactor in the next step. Nitrogen gas is introduced into the bottom of the hydrothermal reactor in admixture with the heated sewage sludge. Nitrogen is also used to quickly repressurize the hydrothermal vessel and the first flash evaporation vessel. The nitrogen is introduced below the liquid level of the hydrothermal reactor instead of directly into the vapor space as might be expected. The injection at this location multiplies the volumetric effectiveness of the nitrogen in three ways: (1) it assures the rapid heating of the gas because of the better heat transfer from liquid to gas; (2) it allows humidification of the dry $N_2$ and, (3) it allows the rising $N_2$ to strip any gases from the sludge. The savings in nitrogen may be as much as forty-fold compared to the addition of cold $N_2$ to the vapor space.

The sewage sludge is hydrothermally reacted in a closed vertical cylindrically shaped vessel for about 15 to 45 minutes at a temperature in the range of about 400° F. to 600° F. and at a pressure in the range of about 700 to 800 psig and above the vapor pressure of water at the reaction temperature. The fiber and gel structure of the sewage sludge are broken down and trapped water is liberated during the hydrothermal treatment.

A slowly rotating paddle e.g. at about 45 to 235 rpm, along the central axis of the reaction vessel is used to stir the sewage sludge in order to keep the solids in suspension during the hydrothermal step. Some vapor, substantially comprising steam, nitrogen and organic vapors, may leave from the top of the hydrothermal unit. A portion of the vapor is introduced into the top of the first flash vaporization vessel in order to pressurize said vessel. The remainder of said vapor is cooled and non-condensible gases are separated from condensible liquid. The non-condensible gases are washed with water in a gas cleaning operation prior to being discharged into the atmosphere. The condensate is sent to a water purification unit prior to discharge from the system.

The hydrothermally treated pumpable sewage sludge leaves from the top of the hydrothermal vessel with a solids content in the range of about 3 to 35 wt. %, a temperature in the range of about 400° F. to 600° F., a pressure in the range of about 700 to 800 psig and at a viscosity in the range of about 300 to 1000 cP and enters the first vessel of a multi-step first flash evaporation zone comprising one or more e.g. 1–4 vessels for dewatering the hydrothermally treated sewage sludge. About 30 to 45 wt. % of the water remaining in the hydrothermally treated sewage sludge is removed in the first flash evaporation zone by isentropic adiabatic expansion of the pumpable slurry of sewage sludge. Then, in a second flash evaporation zone comprising at least one vessel, e.g. 1–4 and preferably one vessel, an additional 5 to 10 wt. % of the water remaining in the sewage sludge from the first flash evaporation zone is removed by flashing, by isentropic adiabatic expansion of the pumpable slurry of sewage sludge from the first flash evaporation zone, and the flashed dewatered sewage sludge product is stored.

The subject multi-step flash evaporation is an important improvement over a single flash evaporation step. Advantageously, by the subject process, there is no plugging of the conventional throttling valves used to provide the pressure let-down in the manner that occurred with only one throttling step. It was found by applicants that when aqueous slurries of sewage sludge were flashed in one step, froth in the form of volatiles and solids deposited out in the valve ports and caused the valve to plug. This problem is avoided by applicants' process in which the solids and BOD (biological oxygen demand) in the sewage sludge slurry carryover in the vapor phase are reduced.

Most of the flashing is carried out by isolating a batch of treated sludge in a vessel in the first flash evaporation zone and sequentially reducing the pressure for example, from about 700 psig to 300 psig, then to about 100 psig, and then to about 40 psig. This batch operation reduces the wear that would occur to an orifice if the process were to be carried out continuously. The first flash evaporation vessel is small relative to the hydrothermal treating vessel or to a subsequent second flash evaporation vessel in a second flash evaporation zone in order to facilitate a rapid operation which reduces heat loss from the first flash evaporation vessel. Further, wide pressure fluctuations in the hydrothermal treating vessel are avoided. Once the pressure is reduced to about 40 psig in the first flash evaporation zone, additional flashing can proceed in a subsequent flash evaporation vessel in a second flash evaporation zone on a continuous basis under less severe conditions. The continuous operation of a subsequent flash evaporation vessel in the second flash evaporation zone provides a steady delivery of product from the process. For example, with only one evaporation vessel in each of the first and second evaporation zones, the volume of the flash evaporation vessel in the second flash evaporation zone is about 2 to 4 times larger than the flash evaporation vessel in the first flash evaporation zone (for example 125 gal. vs. 42 gal.) to provide surge capacity.

In a preferred embodiment of the subject process, the sewage sludge in the first flash evaporation zone is dewatered in a single vessel in three steps. For example, about 10 to 15 wt. % of the total water remaining in the sewage sludge in a first flash evaporation vessel is removed overhead in each of three successive flashing steps. In the first step, a conventional throttling valve in a vent line at the top of the first flash evaporation vessel is partially opened and the pressure on the sewage sludge which was at the entering pressure in the range of about 700 psig to 800 psig and at a temperature in the range of about 400° F. to 600° F. falls to a pressure in the range of about 200 psig to 500 psig. The temperature drops to saturation temperature for the corresponding pressure in the range of about 380° F. to 470° F. After a delay in the range of about 0 to 30 seconds, for the second time the throttling valve is opened a little more and the pressure in the first vessel falls to a pressure in the range of about 75 psig to 300 psig. The temperature drops to saturation temperature for the corresponding pressure in the range of about 300° F. to 420° F. After a delay in the range of about 0 to 30 seconds, the throttling valve is opened for the third time a little more and the pressure in the first vessel falls to a pressure in the range of about 25 psig to 75 psig. The temperature drops to a saturation temperature for the corresponding pressure in the range of about 240° F. to 310° F.

The vapors leaving the flash evaporation vessel in the first flash evaporation zone pass through the throttling valve, and for example substantially comprises in wt. % $H_2O$ 10, $CO_2$ 60, $N_2$ 30, and solubles <1. The solubles comprise nonmethane hydrocarbons. These vapors are combined with those leaving a single flash evaporation vessel in a second flash evaporation zone, and the mixture of vapors is then passed through a cooler. The condensible liquids are separated then from the noncondensible vapors in a separation zone. The vapors are sent to a gas purification zone before being discharged to the atmosphere. The condensate is sent to a water purification zone before being discharged.

The partially dewatered pumpable sewage sludge from the bottom of the flash vessel in the first flash evaporation zone having a solids content in the range of about 4 to 40 wt. %, a pressure in the range of about 25 to 75 psig, and a saturation temperature for the corresponding pressure in the range of about 240° F. to 310° F. is introduced into a flash vessel in a second flash evaporation zone for additional dewatering and storage. The pressure in the flash evaporation vessel is in the range of about 10 to 30 psig so that flashing of the sewage sludge takes place immediately upon entry. Dewatered pumpable sewage sludge product leaves from the bottom of the flash evaporation zone having a solids content in the range of about 5 to 50 wt. %, a viscosity in the range of about 500 to 1200 cP, a pressure in the range of about 5 to 50 psig, and a saturation temperature for the corresponding pressure in the range of about 200° F. to 300° F.

Vapor, substantially comprising $H_2O$ and some solubles, is removed from the flash evaporation vessel in the second flash evaporation zone by way of a vent pipe at the top of the vessel. As previously described, this vapor is combined with the overhead vapor from the flash vessel in the first flash evaporation zone and sent to the gas purification unit. The sewage sludge product may be disposed of by burning either alone or in admixture with a supplemental fuel in a partial oxidation gasifier, furnace, boiler, or incinerator. Further, the sewage sludge product meets the requirements of Federal Regulation 40 CFR Parts 257 and 503 and may be used as landfill or land applied.

DESCRIPTION OF THE FIGURE

A more complete understanding of the invention may be had by reference to the accompanying FIGURE which illustrates a preferred embodiment of the invention. It is not intended to limit the subject invention to the particular process or materials described.

Dewatered municipal sanitary sewage in line 1 is introduced into hopper 2 and from there into heated conveyor 3. Hot oil in line 4 is passed through the hollow axle and screw of conveyor 3 to provide the necessary heat. The cooled oil exits through line 5. The heated sludge is passed through mascerator 6 where the sewage sludge is cut and sized into small pieces. By this means downstream equipment are protected from oversized tramp materials. Screw feeder 7 fills piston chamber 8 with sewage sludge. Forward movement of piston 9 applies pressure to the sewage sludge and moves it through pipe 10, indirect heat exchanger 11, and line 12. Hot oil in line 13 provides the heat to bring the sewage sludge up to the required temperature for the hydrothermal reaction in vessel 25. The cooled oil leaves by line 14. Hydrothermal vessel 23 and first flash vaporization vessel 30 are pressurized with nitrogen gas by opening valves 18, 21 and 32 and closing valves 26, 36, 40 and 44. Nitrogen gas from line 15 is compressed by compressor 16 and then passed through line 17, valve 18 and line 19. Heated sewage sludge from line 12 at a temperature of about 500° F. is mixed in line 20 with the nitrogen gas from line 19. The mixture of sewage sludge and nitrogen is then passed through valve 21 and line 22 up through the bottom of hydrothermal vessel 23. After hydrothermal vessel 23 is filled to the desired level valves 18 and 32 are closed. Slow moving paddle-type agitator 24, driven by motor 25, is used to stir the materials in closed vessel 25 during the hydrothermal reaction at a temperature of for example 500° F. and a pressure which is above the vapor pressure of water at that temperature e.g. about 680 psig. Vent valve 26 in lines 27 and 28 is normally closed. However, in case of emergency, valve 26 may be opened to vent the vapors from vessel 23 through lines 29, 38, 39, cooler 50, line 51, and separating tank 52. First flash vessel 30 is pressurized with nitrogen which passes through lines 27, 31, valve 32, and lines 33 and 34. The desired pressure in first flash vessel 30 is set by valve 40 in line 41. Vessel 30 is vented through lines 34, 41, valve 40, and lines 42, 38, 39, cooler 50, line 51, and separating vessel 52.

Hydrothermally treated sewage sludge is removed from the upper portion of vessel 23 by way of line 35, valve 36 and is passed into flash evaporation vessel 30 by way of line 37. After being flashed and dewatered in three separate steps, valves 48 and 63 preset at a fixed pressure, valve 44 is opened and the flashed sewage sludge from vessel 30 is passed through line 43 at the bottom of vessel 30, valve 44, and line 45 into the second flash vessel 46. Since the pressure in vessel 30 is set higher than that in vessel 46 by adjusting valve 40, the sewage sludge enters vessel 46 and is simultaneously flashed and dewatered. By closing valve 44 flashing in vessel 46 is stopped. The pressure in vessel 46 forces the hot sewage sludge out through line 60. The sewage sludge is cooled in heat exchanger 61 by indirect heat exchange with a coolant e.g. water which enters through line 65 and leaves through line 66. The overhead vapors from vessel 46 are passed through line 47, valve 48, line 49 and are mixed in line 39 with the overhead vapors from the first flash vessel 30 and any vapors from hydrothermal vessel 23. The mixture of vapors in line 39 are then passed through cooler 50, line 51, and vapor-liquid separator 52. Cold water may be the coolant in cooler 50. Uncondensed overhead vapor is passed through line 53 and is mixed in line 54 with the overhead vapors from oil heated conveyor 3 from line 68. The composition of the gaseous vapors in line 54 may substantially comprise the following in wt. %: $N_2$ 33 and $CO_2$ 67. Aqueous condensate is removed from separating vessel 52 through line 55 at the bottom. The condensate is pumped by means of pump 56 through line 57, valve 58 and line 59 and may be preferably sent to a conventional water recovery unit.

The dewatered sanitized sewage sludge product leaves at the bottom of the second flash evaporation vessel 46 by way of line 60, heat exchanger 61, line 62, valve 63 and line 64. The pumpable sewage sludge product may be used as a fuel in a partial oxidation gasifier, boiler, furnace, or incinerator. Alternatively, the sewage sludge product may be disposed of as landfill or land applied.

A new cycle begins by closing valve 44 and repressurizing the system with nitrogen by opening valves 18 and 32 and closing valve 36.

Advantageously, the heat transfer fluids e.g. water or oil in line 70 and/or line 65 are respectively heated by indirect heat exchange with the vapors from line 39 and/or the sewage sludge product from line 60. The heated heat transfer fluid may be then passed in indirect heat exchange with the initial sewage sludge feed from line 1 to preheat the oil in line 4 or the sewage sludge prior to being introduced into conveyor-heater 3.

Although modification and variations of the invention may be made without departing from the spirit and scope thereof, only such limitations should be imposed as are indicated in the appended claims.

We claim:

1. An improved process for treating sewage sludge comprising the steps of: (1) simultaneously conveying and preheating an aqueous sludge slurry feed having a solids content in the range of about 3 to 35 wt. % to a temperature in the range of about 100° F. to 200° F.; (2) mascerating the sewage sludge from (2); (3) pumping by means of a reciprocating positive displacement pump the mascerated sewage sludge from (2) through an indirect heat exchanger to raise said sludge to a temperature in the range of about 400° F. to 600° F.; (4) hydrothermally treating the heated sewage sludge from (3) in a closed reaction vessel under a blanket of nitrogen at a temperature in the range of about 400° F. to 600° F. and a pressure in the range of about 700 to 800 psig and above the vapor pressure of water at the reaction temperature to break down the fiber and gel structure of said sludge and to liberate trapped water; (5) dewatering and cooling the hydrothermally treated sludge from (4) in a first multi-step flash evaporation zone where the pressure is dropped from about 700 to 800 psig to a value in the range of about 25 to 75 psig and the saturation temperature falls to a value in the range of about 300° F. to 400° F. in two or more flash evaporation steps; and then in a second flash evaporation zone the pressure is dropped to a value in the range of about 10 psig to 50 psig and the saturation temperature falls to about 200° F. to 300° F. in one or more flash evaporation steps; (6) cooling the vapor from said first and second flash evaporation zones and separating out condensed liquids and uncondensed gases; and (7) removing a dewatered pumpable slurry of sludge from (5) having a solids content in the range of about 5 to 50 wt. % and a reduced amount of pathogens.

2. The process of claim 1 wherein said aqueous sludge slurry feed is preheated in (1) for about 30 seconds to 5 minutes, and said hydrothermal treatment in (4) takes place in about 15 to 45 minutes.

3. The process of claim 1 where in said first multi-step flash evaporation zone in (4) said pressure drop is effected in three flash evaporation steps; and in said second flash evaporation zone said pressure drop is effected in one flash evaporation step.

4. The process of claim 1 where in (2) said sewage sludge is mascerated to small pieces having a maximum size of about $\frac{1}{4}'' \times \frac{1}{4}'' \times 2''$.

5. The process of claim 1 wherein said aqueous sludge slurry feed enters the preheater-conveyor in (1) having a viscosity in the range of about 5,000 to 20,000 cP (when measured at 180° F.) and leaves with a viscosity in the range of about 2,000 to 5,000 cP (when measured at 180° F.).

6. The process of claim 1 where in (3) said sewage sludge enters said indirect heat exchanger at a temperature in the range of about 100° F. to 200° F. and a viscosity in the range of about 2,000 to 3,000 cP (when measured at 180° F.) and leaves at a temperature in the range of about 400° F. to 600° F. and a viscosity in the range of about 1,000 to 15,000 cP (when measured at 180° F.).

7. The process of claim 1 whereby said nitrogen in (4) is introduced into the bottom of said reaction vessel in admixture with said heated sewage sludge.

8. The process of claim 1, whereby a paddle slowly rotating at 45 to 235 rpm stirs the sewage sludge in (4) during said hydrothermal treatment.

9. The process of claim 1 whereby the hydrothermally treated sewage sludge from (4) leaves said hydrothermal vessel at a temperature in the range of about 700 to 800 psig and at a viscosity in the range of about 300 to 1,000 cP and enters the first vessel of said first flash evaporation zone for dewatering said hydrothermally treated sewage sludge by removing about 30 to 40 wt. % of the water remaining in said hydrothermally treated sewage sludge in said first flash evaporation zone by isentropic adiabatic expansion.

10. The process of claim 1 where in said first multi-step flash evaporation zone in (5) about 10 to 15 wt. % of the total water remaining in the sewage sludge is removed in a first flash evaporation vessel in each of three successive flashing steps.

11. The process of claim 10 wherein said flashing in said first flash evaporation zone comprises (1) partially opening a throttling valve in the vent line of a first flash vessel; and dropping the pressure to a value in the range of about 200 psig to 500 psig; (2) partially opening the throttling valve a little more and dropping the pressure to a value in the range of about 75 psig to 300 psig; and (3) partially opening the throttling valve a little more and dropping the pressure to a value in the range of about 25 psig to 75 psig.

12. The process of claim 11 wherein said flashing in said second flash evaporation zone in (5) comprises introducing the flashed sewage sludge from said first flash evaporation zone into a second flash vessel having a pressure in the range of about 10 to 30 psig; and removing from the bottom of said second flash vessel, dewatered pumpable sewage sludge product having a solids content in the range of about 5 to 50 wt. %, a viscosity in the range of about 500 to 1,200 cP (when measured at 180° F.), and a pressure in the range of about 5 to 50 psig.

13. The process of claim 12 provided with the step of burning said pumpable sewage sludge product either alone or in admixture with a supplemental fuel in a partial oxidation gasifier, furnace, boiler, or incinerator.

14. The process of claim 12 provided with the step of using said pumpable sewage sludge product as land-fill or for land application.

15. The process of claim 1 wherein each of said first and second flash evaporation zones comprise 1 to 4 vessels.

16. The process of claim 1 wherein said first flash evaporation zone comprises one vessel, said second flash evaporation zone comprises one vessel, and the volume of said vessel in said second flash evaporation zone is 2 to 4 times the volume of said vessel in said first evaporation zone.

17. The process of claim 1 where in (3) said mascerated sewage sludge is pumped through said double pipe heat exchanger for about 8 to 10 minutes.

* * * * *